Dec. 28, 1926.

M. F. PHELPS 1,612,215

MACHINE FOR RECEIVING AND PARKING CONTAINERS

Filed Nov. 12, 1921    12 Sheets-Sheet 1

INVENTOR
MORTON F. PHELPS
By Paul & Paul
His Attorneys

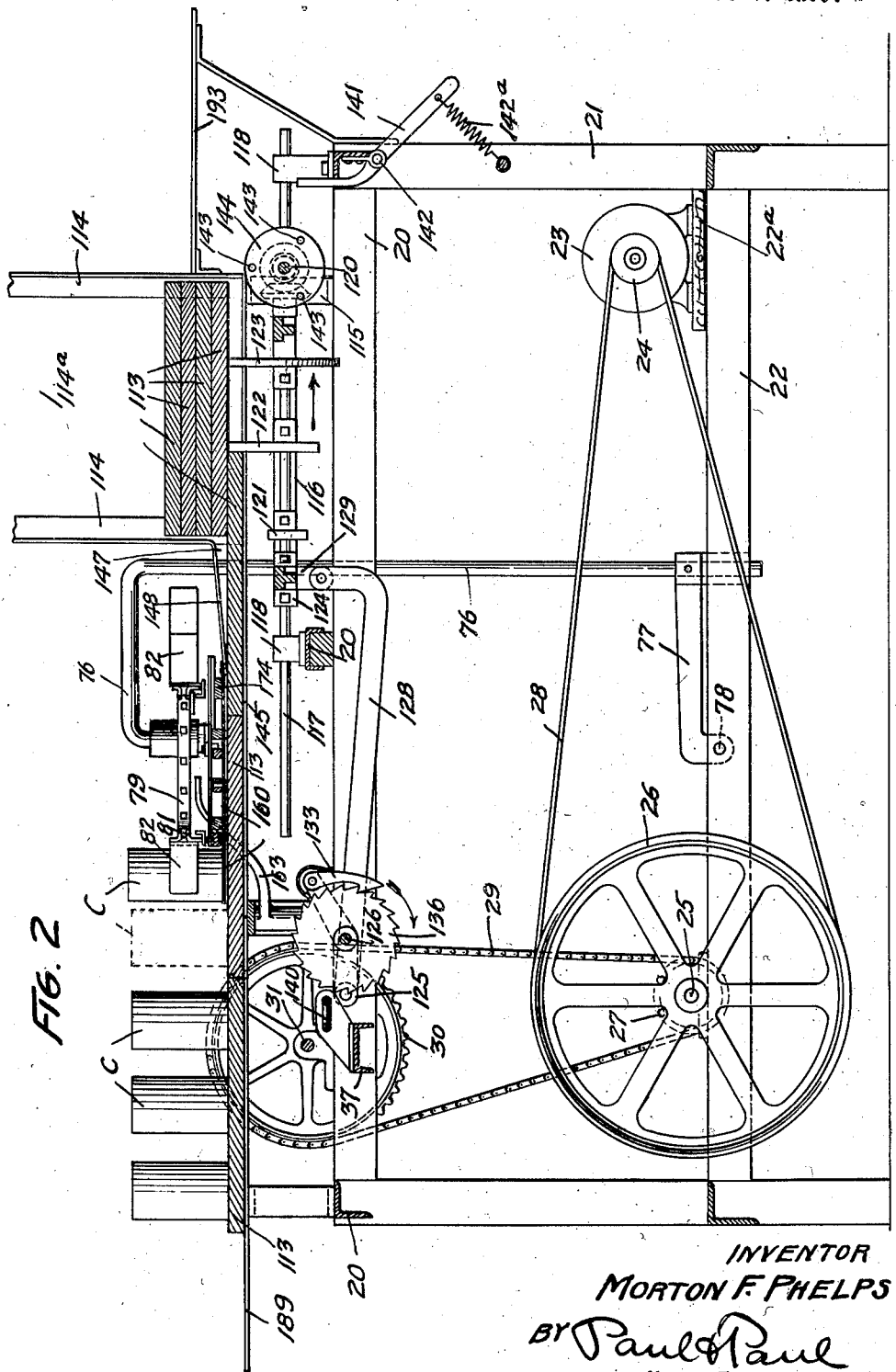

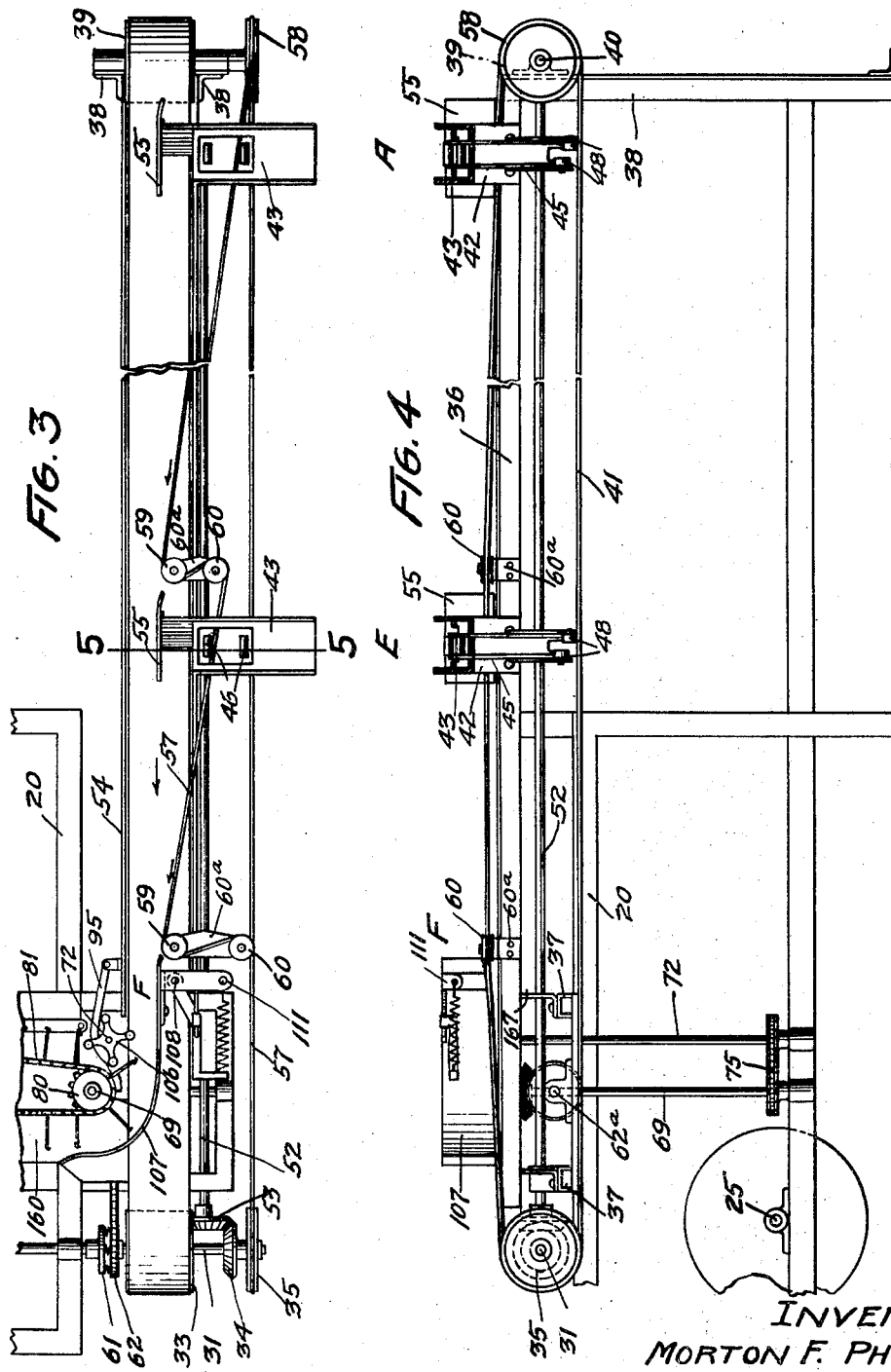

Dec. 28, 1926.
1,612,215
M. F. PHELPS
MACHINE FOR RECEIVING AND PARKING CONTAINERS
Filed Nov. 12, 1921    12 Sheets-Sheet 4
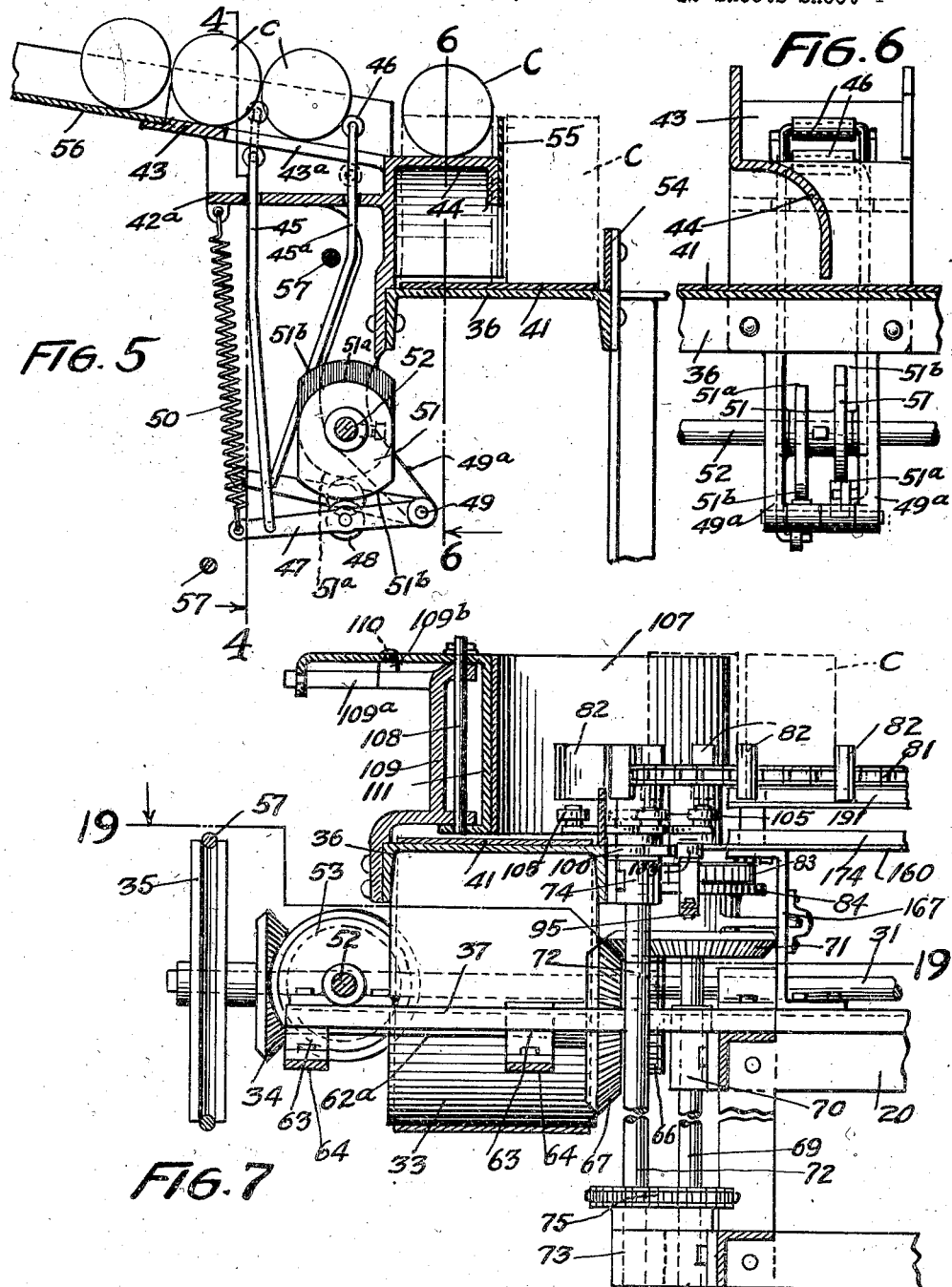
INVENTOR
MORTON F. PHELPS
BY Paul & Paul
HIS ATTORNEYS Dec. 28, 1926.
M. F. PHELPS
1,612,215
MACHINE FOR RECEIVING AND PARKING CONTAINERS
Filed Nov. 12, 1921     12 Sheets-Sheet 5
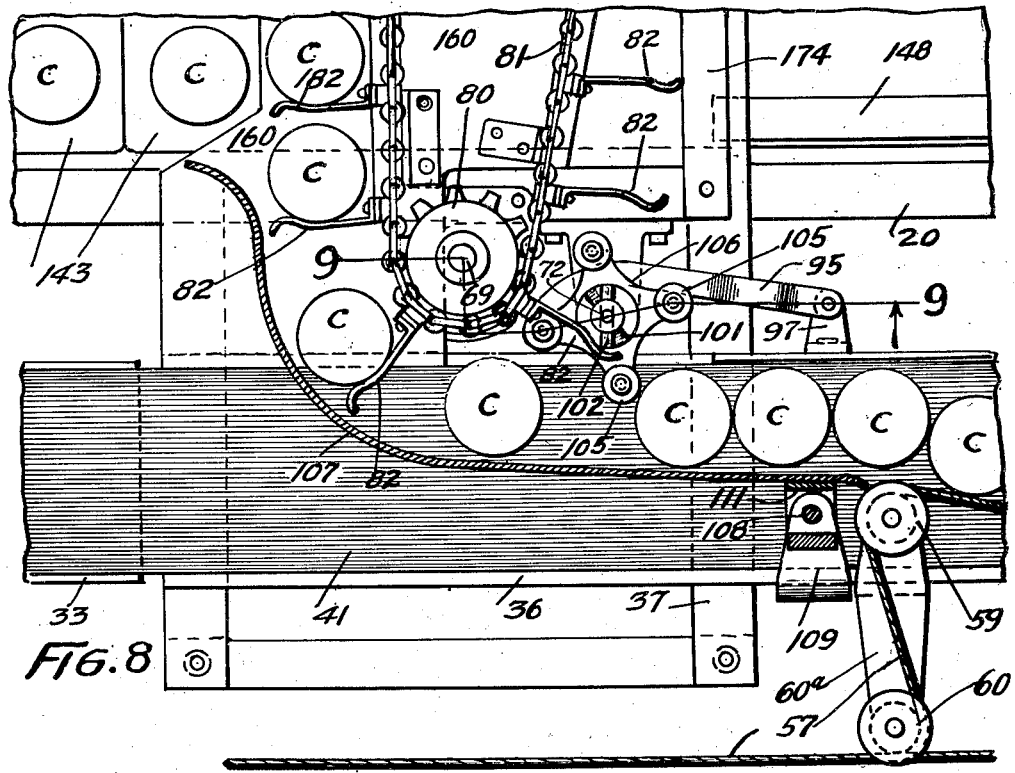
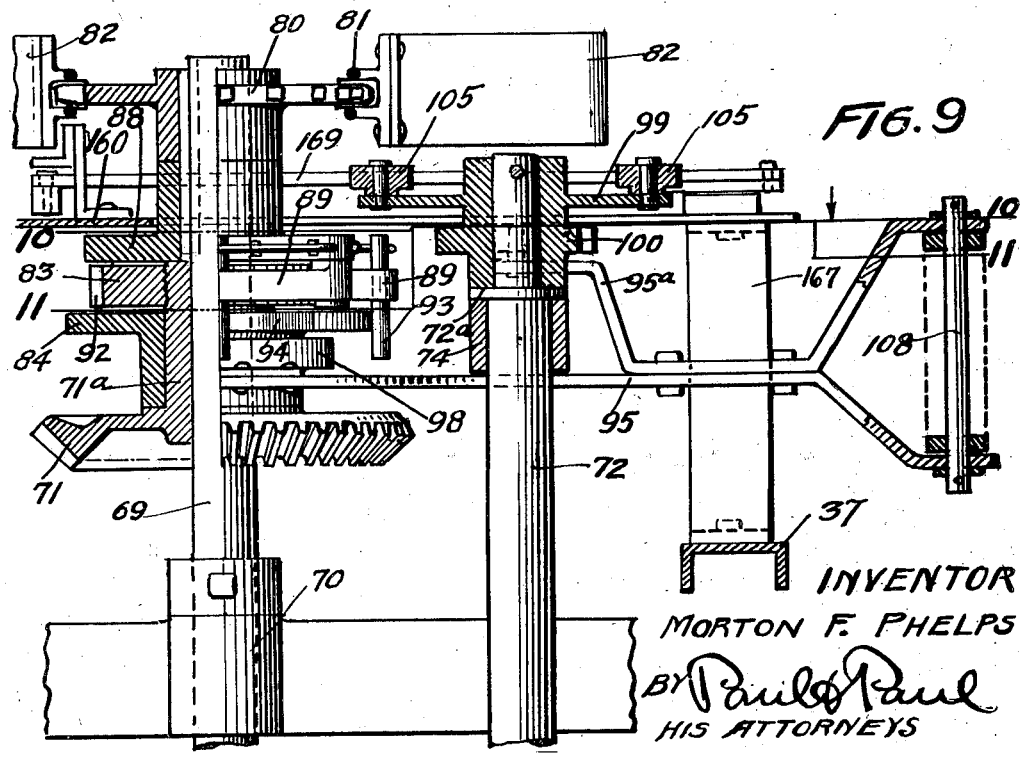
INVENTOR
MORTON F. PHELPS
BY Paul & Paul
HIS ATTORNEYS Dec. 28, 1926.

M. F. PHELPS 1,612,215

MACHINE FOR RECEIVING AND PARKING CONTAINERS

Filed Nov. 12, 1921

INVENTOR
MORTON F. PHELPS
BY Paul & Paul
HIS ATTORNEYS.

Dec. 28, 1926. 1,612,215
M. F. PHELPS
MACHINE FOR RECEIVING AND PARKING CONTAINERS
Filed Nov. 12, 1921 12 Sheets-Sheet 7
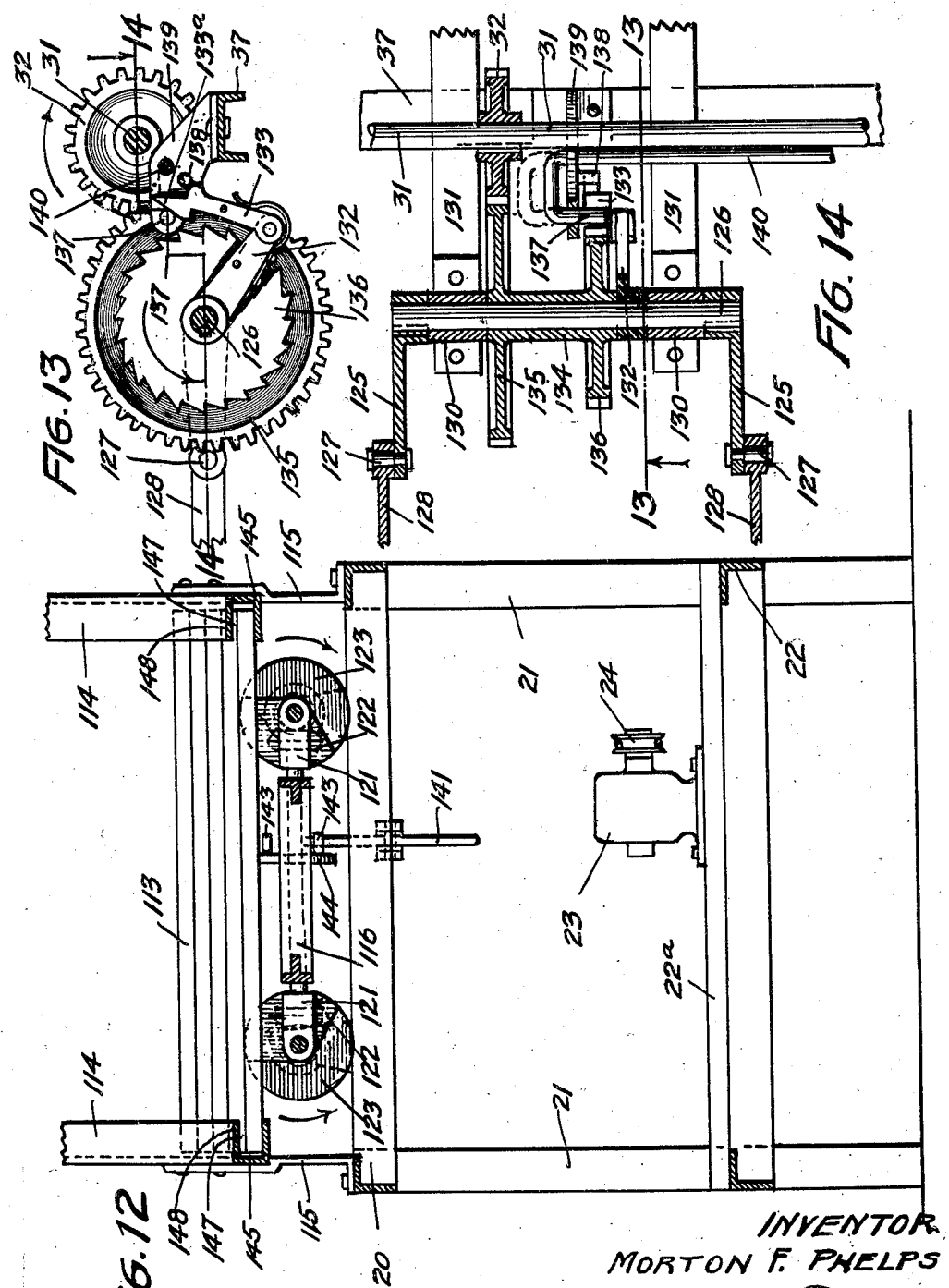
INVENTOR
MORTON F. PHELPS
BY Paul & Paul
HIS ATTORNES Dec. 28, 1926.

M. F. PHELPS 1,612,215

MACHINE FOR RECEIVING AND PARKING CONTAINERS

Filed Nov. 12, 1921     12 Sheets-Sheet 8

INVENTOR
MORTON F. PHELPS

By Paul & Paul
His Attorneys

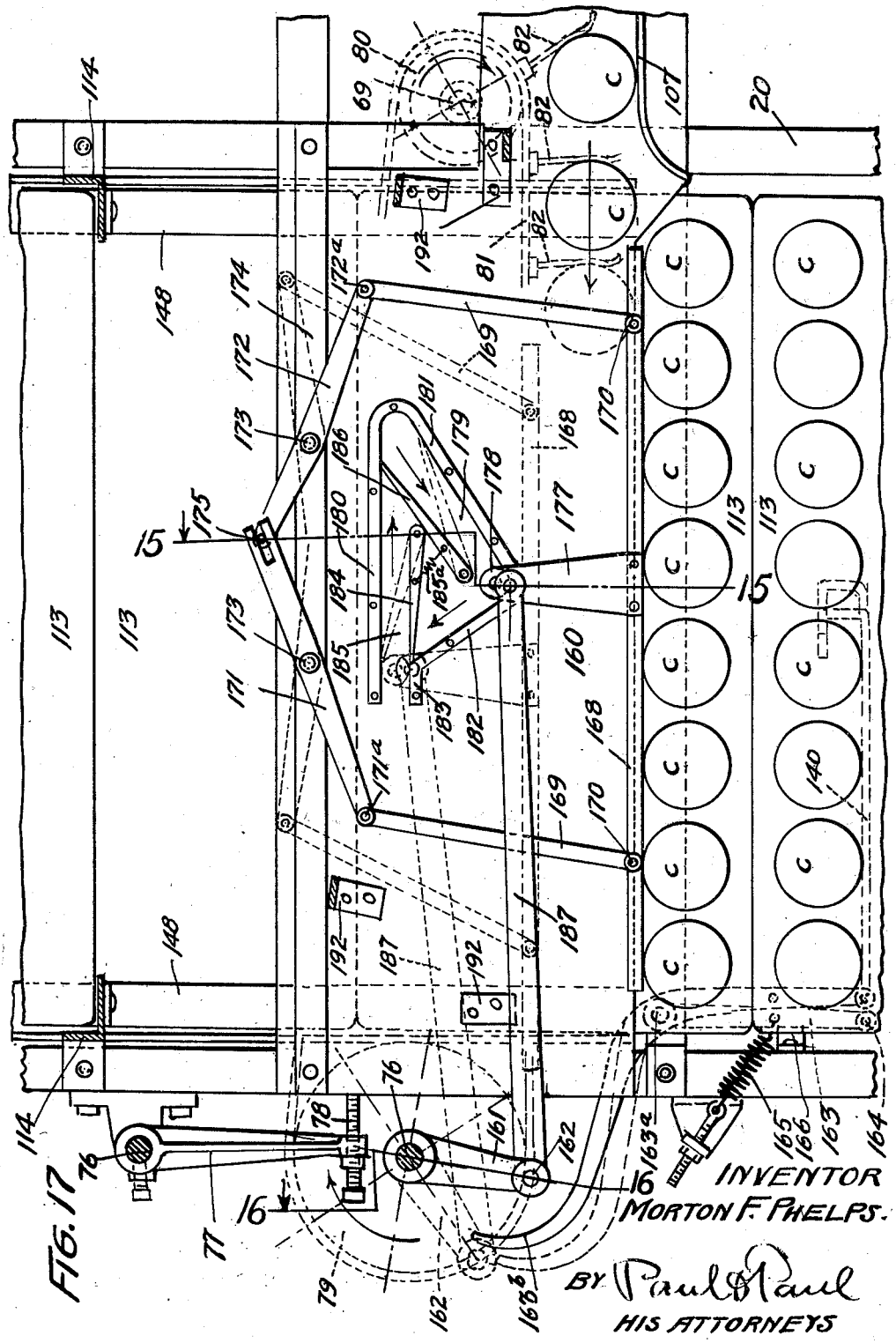

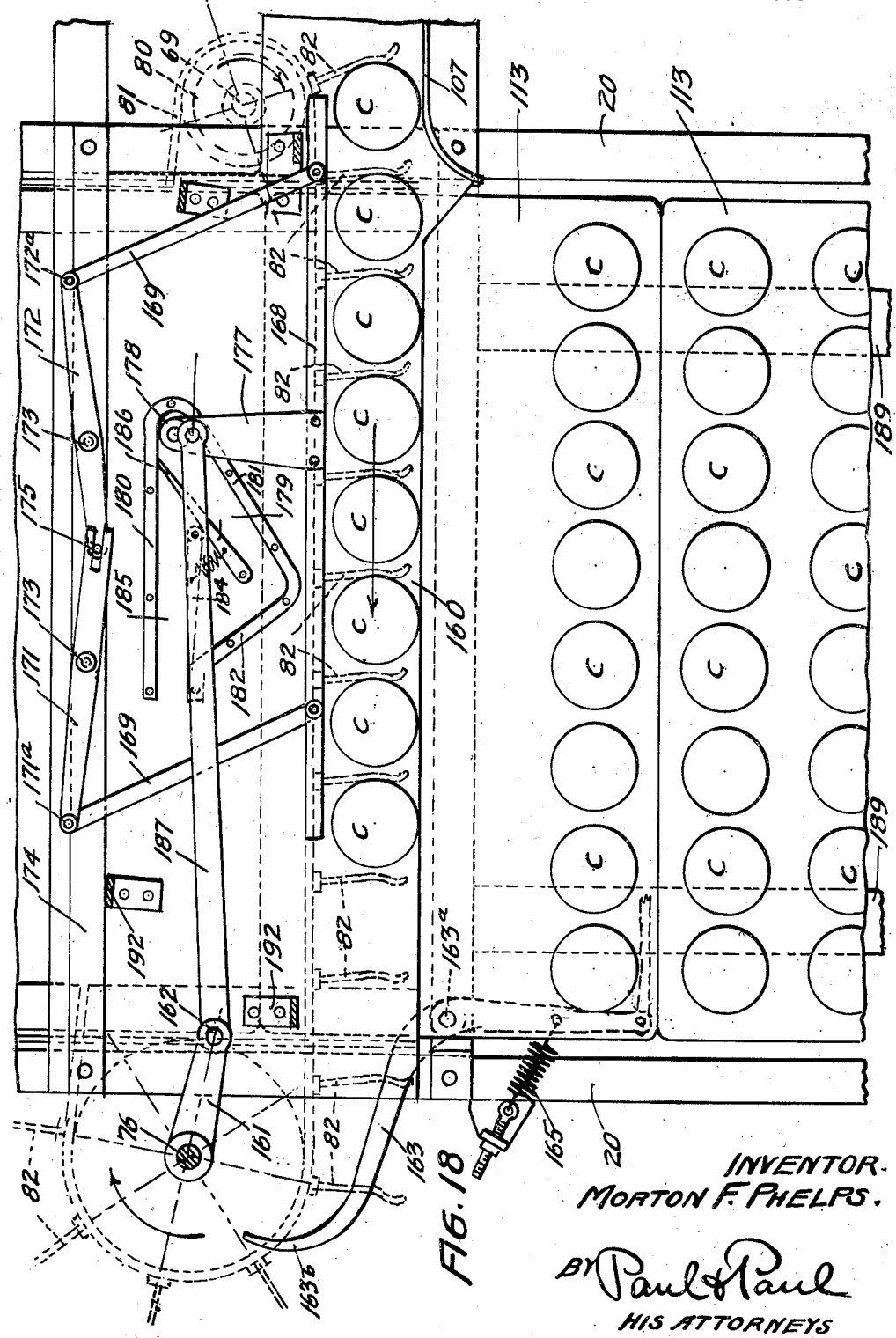

Dec. 28, 1926.
M. F. PHELPS
1,612,215
MACHINE FOR RECEIVING AND PARKING CONTAINERS
Filed Nov. 12, 1921      12 Sheets-Sheet 11
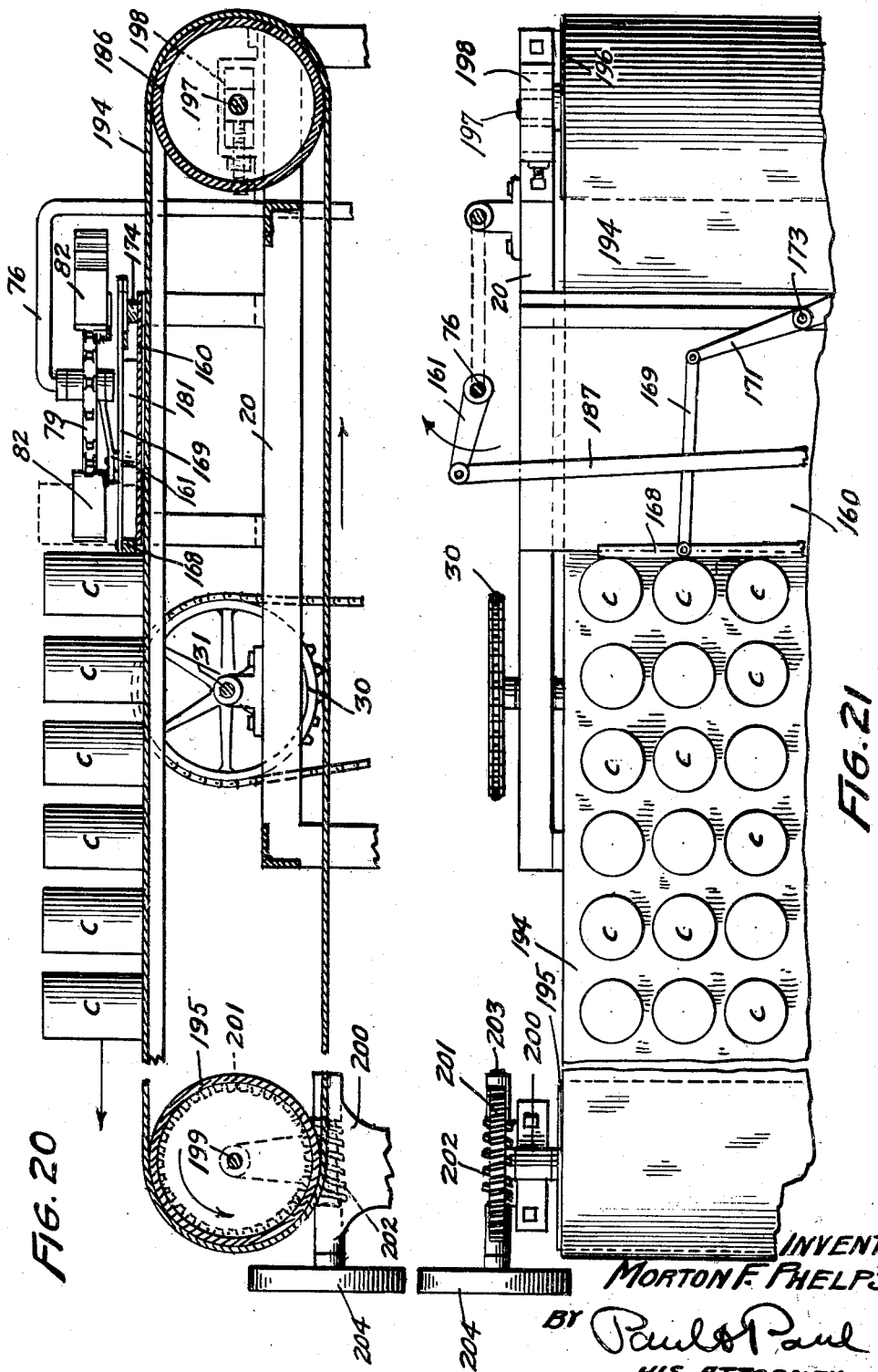
INVENTOR
MORTON F. PHELPS.
BY Paul & Paul
HIS ATTORNEYS

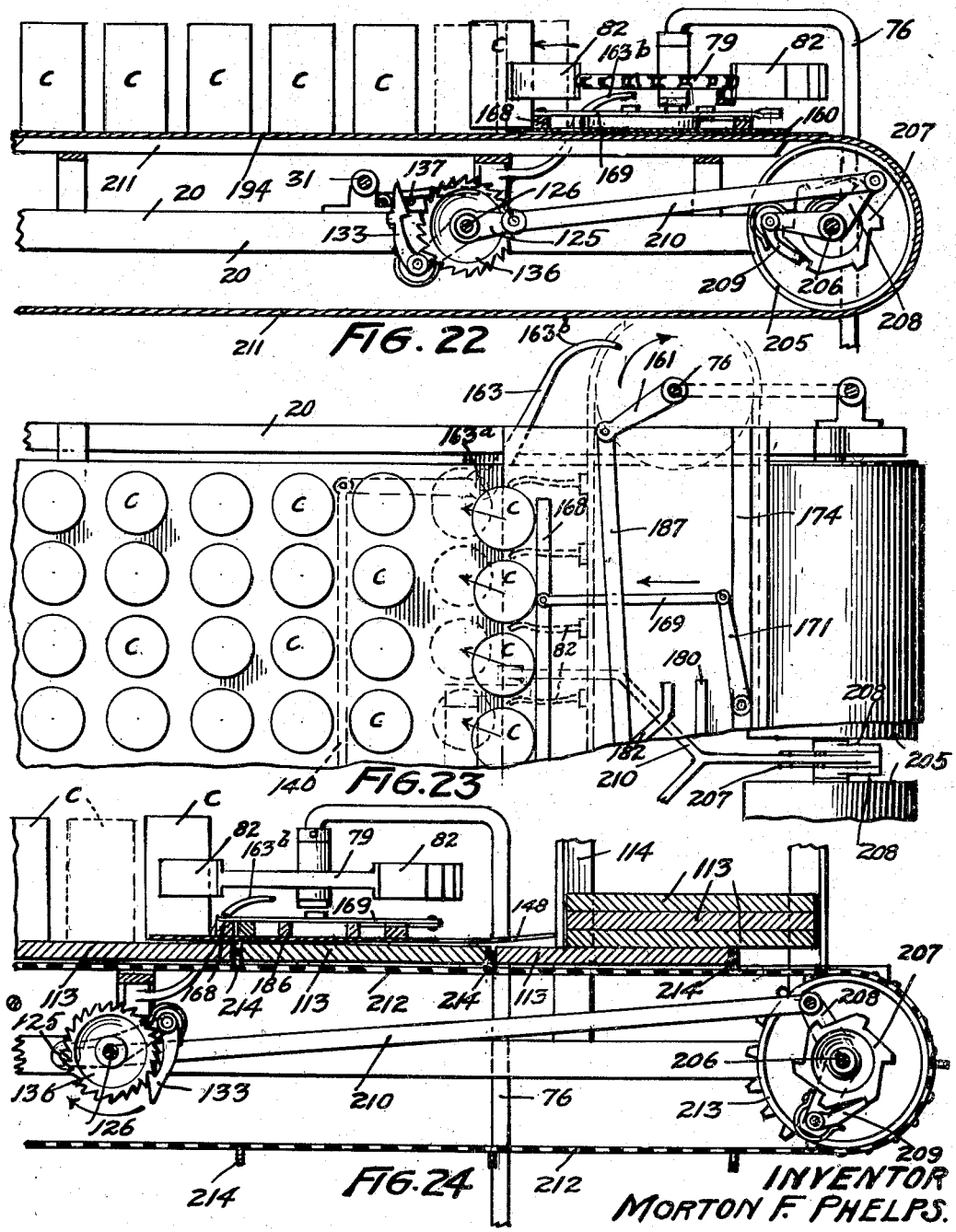

Patented Dec. 28, 1926.

1,612,215

UNITED STATES PATENT OFFICE.

MORTON F. PHELPS, OF LITTLE ROCK, ARKANSAS, ASSIGNOR TO PHELPS MANUFACTURING COMPANY, OF LITTLE ROCK, ARKANSAS, A PARTNERSHIP CONSISTING OF FRANK PHELPS AND SAID MORTON F. PHELPS.

MACHINE FOR RECEIVING AND PARKING CONTAINERS.

Application filed November 12, 1921. Serial No. 514,729.

This invention relates to improvements in machines for receiving cans or other containers or articles from a chute, or a series of chutes, or other delivery stations, and automatically arranging the articles in uniform rows, preferably upon parking plates, trays or carriers, suitable for removal of the cans or containers to drying or storage rooms. The articles may be delivered to the machine continuously or intermittently at one or more receiving stations, and the machine is designed to arrange or park them in rows upon the plates, trays, or carriers, with a predetermined number of articles in each row, and with the rows spaced at predetermined distances on the plates, trays or carriers. In the present application I have disclosed a machine in which there are in each row on the parking tray, eight containers or cans, and in which there are three rows of cans on each tray. It will be understood, however, that any suitable number of containers or other articles may be parked by the machine upon the trays with any desired number of cans to each row and any number of rows, by a slight modification of some parts of the machine.

Where the conditions are favorable, the containers, or other articles, may be placed and arranged by the machine in rows containing a predetermined number of articles upon an endless carrier or belt, instead of upon carrying plates, and this belt may be run at sufficiently slow speed directly through a drying or other preparation room to dry or otherwise prepare the articles, when such operation is desirable.

The invention consists generally in the constructions and combinations as hereinafter described and particularly pointed out in the claims.

In the accompanying drawings forming a part of the specification:

Figure 2 is an enlarged vertical longitudinal section on the line 2—2 of Figure 1, showing the parking trays in position in the machine, and illustrating the step by step movement by which they are advanced;

Figure 3 is a plan view of the receiving and feeding conveyer;

Figure 4 is a side elevation of the same partly in section;

Figure 5 is an enlarged vertical section on the line 5—5 of Figure 3;

Figure 6 is a section on the line 6—6 of Figure 5;

Figure 7 is an enlarged vertical section on the line 7—7 of Figure 1;

Figure 8 is a plan view on an enlarged scale illustrating the manner of feeding the cans to the parking trays or plates;

Figure 9 is an enlarged vertical section on the line 9—9 of Figure 8;

Figure 12 is a vertical cross section on the line 12—12 of Figure 1 through the feed hopper for the parking trays;

Figure 13 is a sectional detail view on the line 13—13 of Figures 1 and 14 illustrating the mechanism for feeding the trays;

Figure 14 is a horizontal section on the line 14—14 of Figure 13;

Figure 17 is a plan view of the mechanism for parking the cans on the trays, showing how a row of cans is fed on to the trays;

Figure 18 is a similar view showing the parts advanced to another position and the trays moved forward a step preparatory to receiving another row of cans from the machine;

Figure 20 is a longitudinal section through the parking mechanism showing an endless carrier underneath said mechanism running at slow, continuous speed, upon which the containers are placed by the machine and which carries said containers to a drying or other room, not shown.

Figure 21 is a plan view of the structure shown in Figure 20;

Figure 22 shows an endless carrier substantially similar to the carrier shown in Figure 20 and for the same purpose, but operated to run intermittently, controlled by the same mechanism as shown for controlling the intermittent feeding of the carrying or parking trays;

Figure 23 is a plan view of the structure shown in Figure 22;

Figure 24 illustrates an endless carrier running intermittently for feeding the trays and carrying the loaded trays to any desired destination.

In application No. 412,665, filed by me in the United States Patent Office on September 25th, 1920, a machine is disclosed for labeling cans, and the machine shown in said application has been largely used for applying labels to filled cans. I find it desirable to arrange a number of these machines side by side and the machine shown and described in the present application is particularly adapted to receive the labeled cans from the labeling machines at receiving stations to which the cans are delivered from each labeling machine. As these machines may not always deliver the cans to the stations at a uniform rate it is desirable to provide self-controlling means in the receiving and parking machine whereby the parking operation is automatically stopped when the supply of cans runs short and again commenced with a supply of cans. Mechanism is therefore provided whereby each incoming can individually controls the operation of the parking mechanism.

*The driving, receiving and conveying mechanism.*

Figure 1:
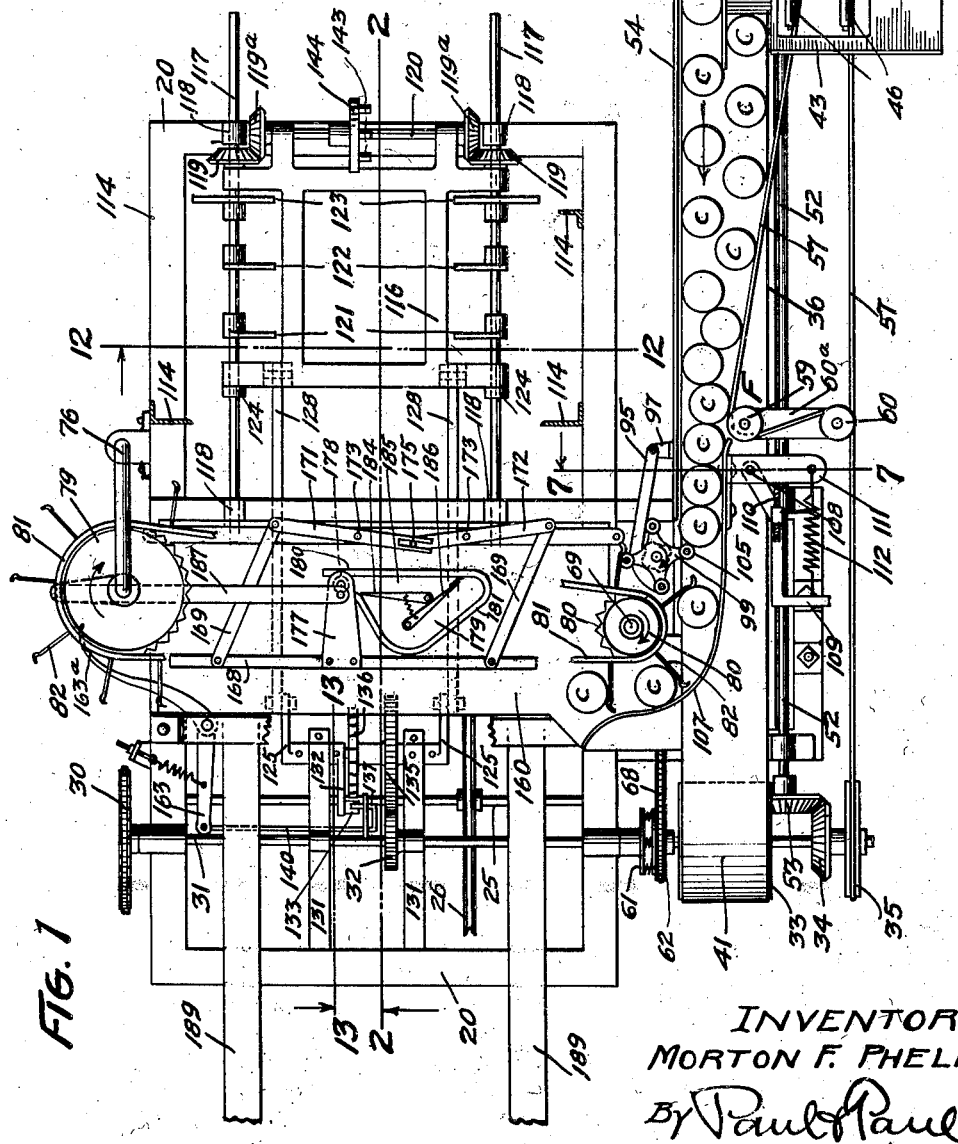
Figure 1 is a plan view of a receiving and parking machine embodying my invention, the parking plates or trays being omitted for the sake of clearness.

Referring to Figures 1 and 2, 20 represents the main rectangular main frame of the machine, which may be of any preferred construction, but is here shown as composed of angle bars riveted or otherwise fastened together and supported on vertical angle bar posts 21. Lower horizontal braces 22 are secured to the posts 21 and a plank 22ª is fastened to these braces at the front end of the machine upon which a motor 23 having a driving pulley 24 is mounted. A shaft 25 is journaled in bearings upon the braces 22 and carries a large pulley 26 and a smaller sprocket wheel 27. A driving belt 28 runs from the motor pulley 24 around the pulley 26, and a sprocket belt 29 runs from the wheel 27 around a larger sprocket wheel 30 arranged upon a shaft 31. This shaft is mounted in bearings on the upper frame 20 and carries a gear 32, a conveyer pulley 33, a bevel gear 34 and a driving pulley 35. Referring now also to Figures 3 to 7 inclusive an auxiliary frame for the receiving and conveying mechanism is attached to one side of the main frame and extends forward the required distance to provide receiving means for the required number of delivering stations. I have illustrated two such stations but as the receiving and conveying means are precisely identical for every station it will be understood that any suitable number of stations may be provided to receive cans. The auxiliary frame consists of a channel bar 36, suitably supported at the rear end of the main frame by cross girders 37, projecting from said frame, and, at the front end, by vertical supporting posts 38. A pulley 39 is mounted upon a shaft 40 having bearings in the extreme front end of the auxiliary frame and a horizontal conveyer belt 41 runs from the conveyer pulley 33 around the pulley 39, its upper portion being supported on the channel bar 36. The two receiving stations shown, A and E consist of a terminal casing 42 secured to the channel bar 36 and having an inclined chute 43 terminating in a curved deflector 44, (Figure 6) curving downwardly substantially at a right angle to the chute and near its center. A slot 43ª is provided in the bottom of the chute 43 through which links 45 and 45ª, preferably carrying rollers 46, alternately project. These links are guided in slots in a rib 42ª of the casing 42, and are approximately spaced apart the diameter of the cans C. They are pivotally connected to followers 47 having rollers 48, said followers being pivoted at 49 to depending lugs 49ª of the casing 42.

Coil springs 50, attached to the arms 47 and rib 42ª, hold the followers 47 against cams 51 carried by a longitudinally mounted shaft 52, preferably having bearing in the depending lugs 49ª, and being driven by means of a bevel gear 53 in mesh with the bevel gear 34 on the driving shaft 31 (Figures 1 and 7). A stationary guide rail 54 is arranged at one edge of the belt 41. This belt is made wide enough to freely accommodate not less than two cans side by side, as indicated in Figure 5. A stop lug or ledge 55 is provided at the end of the deflector 44 substantially midway over the conveyer belt 41, and a chute 56 is arranged to deliver the cans from a labeling machine, or other source of supply, to the terminal chute 43. A guide belt 57 runs from the driving pulley 35 around a pulley 58 mounted at the extreme end of the conveyer, on the shaft 40, and backwards to the pulley 35, in a zigzag course over idler pulleys 59 and 60, (Figures 3 and 8) upon brackets 60ª, located at station E, at intermediate stations (not shown) and at the feeding station F to the parking mechanism. (Figures 1, 3 and 4). The pulleys 35 and 58 are located outside the conveyer belt 41, and the belt 57 runs diagonally from these pulleys substantially to the center of the conveyer belt around the pulleys 59, and crosswise back to the pulleys 60. In operation the guide belt 57 travels and shaft 52 turns in the direction of the arrows. As the cams 51

(Figure 5) are both provided with the high portions 51ª, and low portions 51ᵇ, adjusted to depress and raise the followers 47 and links 45 and 45ª alternately, the cans C, rolling down the terminal chute 43, will be arrested by the projecting end of the links, and will be released one at a time for every revolution of the shaft 52. As the link 45 is raised and the link 45ª lowered by the rotating cam as indicated in dotted lines, the roller 46 is pushed between the two lowest cans which prevents the upper cans in the chute from moving while the lowest can is released and rolls forward till it strikes the ledge 55, when it tilts downwards over the curved surface of the deflector 44 and assumes an upright position on the outward portion of the conveyer belt 41. When the parts again assume the position shown in full lines in Figure 5 the cans in the chute will roll down until they are again arrested by the projecting link 45ª. The cans, as they come down from the chute 43 at each station, drop in an upright position upon the outer half of the conveyer belt 41, and, as they are carried along, are engaged by the diagonal portion of the guide belt 57 running in the same general direction, and at substantially the same speed, and are thereby gradually carried towards the opposite side of the conveyer belt. In this position the cans will be conducted past each succeeding receiving station and the cans delivered to the conveyer at each station at one side of the belt will be guided across the conveyer belt and brought between the cans passing along on the other side of the belt, the guide rail 54 preventing the cans from being crowded off the belt, until they arrive at the feeding station F, as illustrated in Figure 1. It will be understood that the speed of the conveyer belt and the capacity of the parking mechanism is proportioned relative to the total number of cans delivered from the labeling machine or other sources, so that there is always ample room for the cans to pass in single file on the conveyer belt.

*The automatic feed control device.*

Figure 10:
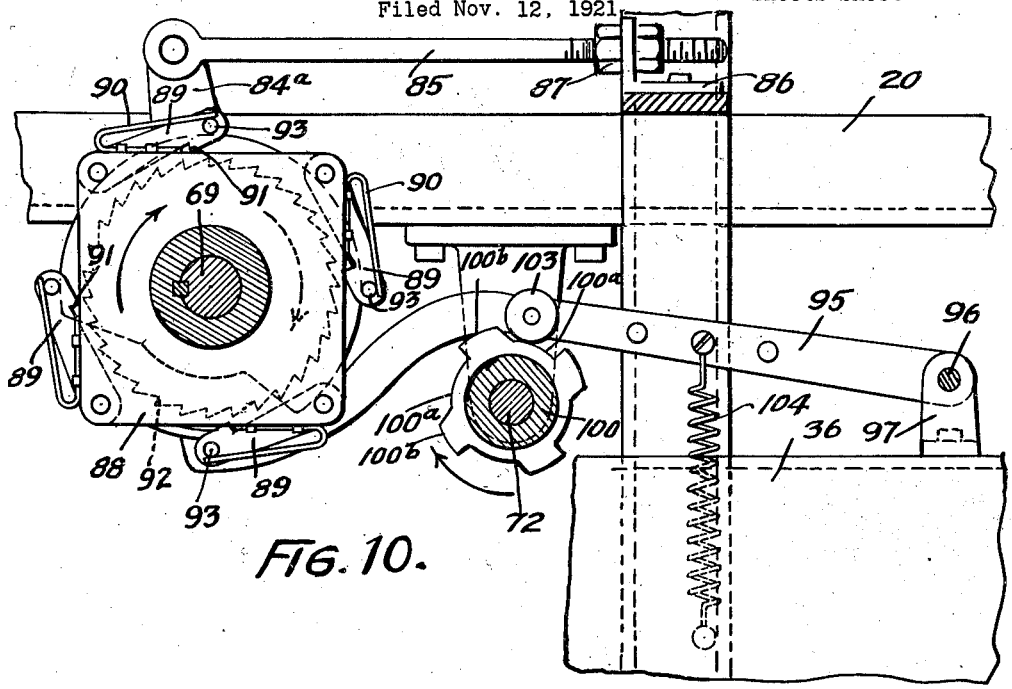
Figure 10 is a plan section on the line 10—10 of Figure 9.
Figure 11:
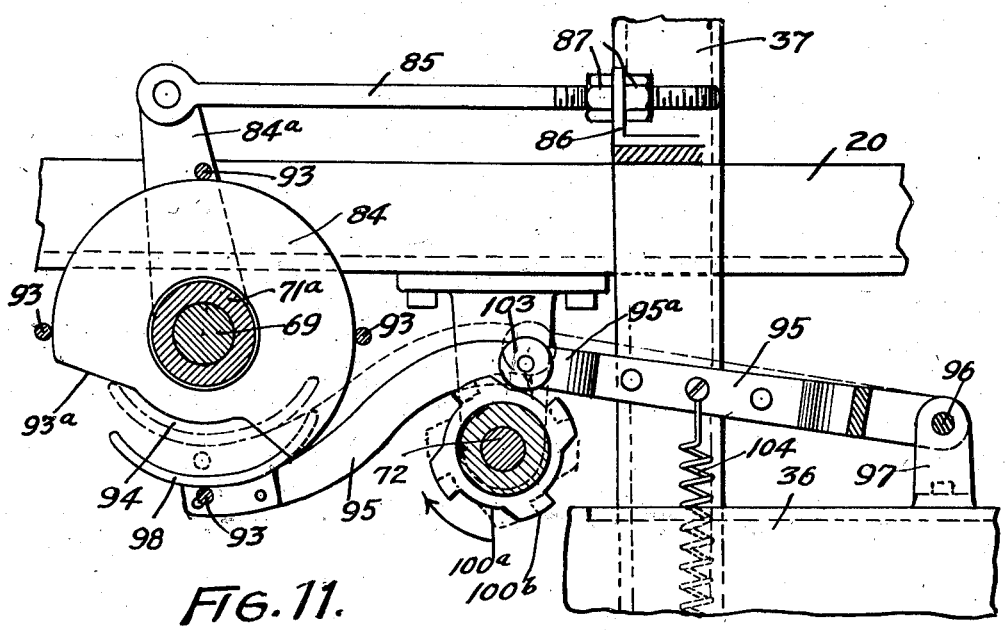
Figure 11 is a similar section on the line 11—11 of Figure 9.
Figure 19:
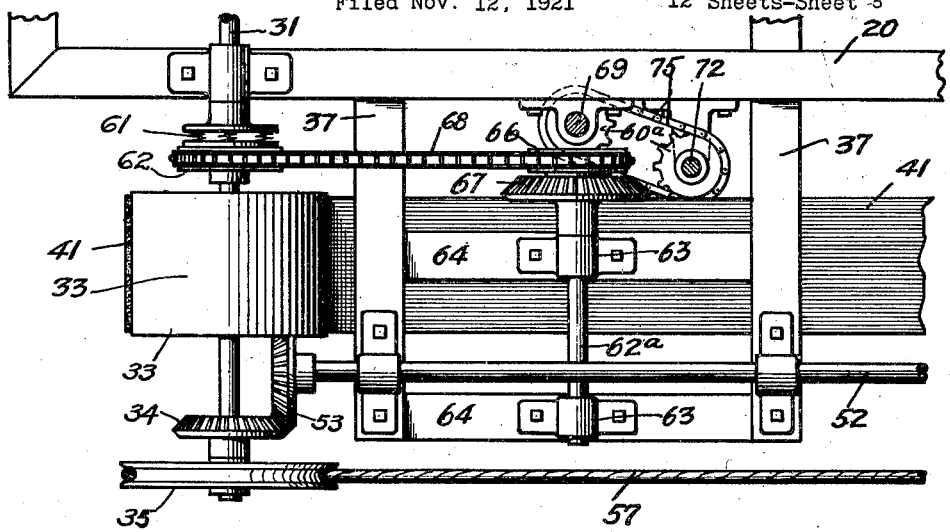
Figure 19 is a horizontal section on the line 19—19 of Figure 7.

Referring to Figures 1, 2, 7 and 19, the mechanism of this device is driven from the shaft 31, preferably through a slip clutch 61 of ordinary construction and having a sprocket wheel 62. A short shaft 62ª is journaled in bearings 63, supported on bars 64 fastened to the channel bars 37, projecting from the main frame 20 under the auxiliary conveyer frame 36 (Figures 4 and 7). This shaft carries a sprocket wheel 66 and a bevel gear 67. A chain belt 68 drives the sprocket wheel 66 from the sprocket wheel 62 and a vertical shaft 69, journaled in bearings 70 upon the main frame, is driven controllably from the short shaft 62ª by means of a loosely mounted bevel gear 71 in mesh with the bevel gear 67 and other mechanism hereinafter described. A controlling vertical shaft 72, (Fig. 9) mounted in a bearing 73 upon the main frame, and a bearing 74, upon the auxiliary frame 36, is driven from the shaft 69 by means of a sprocket chain 75, and suitable sprocket wheels on the shafts 69 and 72. On the opposite side of the machine (Figures 1 and 2) is mounted, on the main frame, a vertical rod 76, having near its lower end an adjusting arm 77 provided with an adjusting screw 78 and having its upper end bent in the form of a U, the short, downwardly pointing arm of which carries a loosely mounted sprocket wheel 79. Upon the upper end of the shaft 69 is fastened a smaller sprocket wheel 80 and said shaft drives the larger sprocket wheel 79 by means of a conveying chain belt 81. A series of conveying lugs 82, spaced uniformly apart to receive the cans between them are fastened to the chain belt 81. As shown in Figures 9, 10 and 11 the hub 71ª of the loosely mounted and constantly running bevel gear 71 on the shaft 69 carries at its upper end a ratchet wheel 83, screwed or otherwise firmly secured to the hub 71ª and a stationary cam 84 is loosely arranged upon the hub 71ª between the bevel gear 71 and ratchet wheel 83. The cam 84 is preferably held from rotation by an integral arm 84ª connected to a rod 85, that is threaded at its end and, passing through a lug 86 of the frame of the machine, is adjustably held in place by nuts 87 (Figure 11). Above the ratchet wheel 83 is arranged a disc 88, shown in rectangular form in Figure 10 and this disc is keyed or otherwise firmly secured to the shaft 69. A series of spring pressed pawls 89, shown as four in number, are pivoted one at each corner of the disc and the pressure of their spring 90 tends to engage the catch 91 of the pawls with the teeth 92 of the ratchet wheel 83. A follower pin 93 depends from the outer end of each pawl past the face of the cam 84 which engages the follower pins on the circular portion of the cam to keep the pawls from contact with the ratchet teeth 92. A recess 94 (Figure 11) is provided in the cam 84 to permit the pawls 89 to engage the ratchet teeth during a part of a revolution of the ratchet wheel, and to automatically release the pawls from the ratchet after said ratchet has driven said disc and the shaft 69 one quarter of a revolution. The engagement of the pawls with the ratchet wheel 83 and the consequent turning of the shaft 69 is controlled and initiated by each can as it arrived at the feeding point, so that when no cans are present at this point the shaft 69 remains stationary. To this end a forked horizontal arm 95 is fulcrumed some distance forward of the shaft 69 on a pin 96, in brackets 97, preferably fastened to the auxiliary frame or channel bar 36. The arm 95 extends rearward to the shaft 69 where it is provided with a segmental cam plate 98, having the same general curvature as the circular portion of the cam 84, as shown in Figure 11. The cam plate 98 is positioned just below the recess 94 of the cam 84 and the pins 93 of the pawls 89 project downward into contact with the curved face of the plate by which one of the follower pins is prevented from entering the recess 94 when the plate is in the position shown in full lines in Figure 11. When, however, the arm 95 is swung inwards to the dotted line position, the follower pin resting against the face of the plate 94 will follow the plate and the corresponding pawl will be permitted to engage the rotating ratchet wheel 83, and the disc 88, shaft 69 and sprocket wheel 80 will be rotated in the direction of the arrow until the follower pin 93 is forced outwards to the circular face of the stationary cam 84, by the inclined face 93$^a$ of the cam, by which the pawl will be disengaged from the ratchet and the shaft 69 will come to a stop after making one quarter of a revolution. At this time the follower pin next in the order of rotation will be in a position opposite the cam recess 94 and cam plate 98. The lateral position of the arm 95 and cam plate 98 is controlled by a pilot wheel 99 carrying a cam 100 and mounted on the upper end of the controlling shaft 72. The said wheel and cam are made integral or otherwise secured together and are loosely mounted, preferably upon a reduced portion of the shaft 72 and resting upon a shoulder 72$^a$ being arranged with only a limited turning movement relative to said shaft. This limited movement is preferably secured by means of elongated slots 101 in the hub of the wheel 99 in which a pin 102 passing through the shaft is permitted a predetermined movement. (See Figures 8 and 9). The face of the cam 100 is composed of alternately low portions 100$^a$ and high portions 100$^b$, and a roller 103, arranged upon a raised portion 95$^a$ of the arm 95, is pressed against the face of the cam 100 by a spring 104. The pilot wheel 99 consists of arms provided with rollers 105 upon their outer ends to protect the labels on the cans between which rollers a circular recess 106, substantially conforming to the form of the cans, is provided. The relation of the conveying lugs 82 on the chain belt 81 to the rollers 103 of the pilot wheel 99, and the position of the arm 95 and cam 100 are substantially as shown in Figures 8 and 9 and full lines in Figure 11, and when a can C carried by the conveyer belt 41 in the direction of the arrow, strikes a roller 105 of the pilot wheel 99, the wheel is turned loosely upon the shaft 72 far enough in the direction of the arrow to move the high portion 100$^b$ under the roller of the arm 95, the slots 101 permitting such movement without turning the shaft 72. The arm 95 will then have assumed the position shown in dotted lines in Figure 11, the pawl 89 will engage the rotating ratchet wheel 83 and the shaft 69 will be turned 90 degrees of a revolution as above described. Since the shaft 69 drives the shaft 72 through the chain belt 75 and at equal ratio, the shaft 72 will also be turned 90 degrees of one revolution. The relative movement of the conveyer belts 41 and 81 and the shaft 69 and 72 is timed so that as the wheel 83 turns, impelled first by the can and then by the shaft, the can passes into a recess of the wheel between the rollers 105 and from thence between two of the conveying lugs of the chain 81, as shown in Figure 8 by which the can is carried around the sprocket 80 and off the conveyer belt in a curved path. As the can emerges from the recess in the wheel 83 and is disengaged from the rollers of the wheel, the rotating shaft 72 carrying the pin 102 will advance in the slots 101 and turn the wheel until arrested by the stoppage of the shaft 69 as above described when the parts will again be in the position shown in full lines in Figures 8, 10 and 11.

The feeding mechanism will then remain inactive until another can on the belt 41 operates to turn the wheel 99 and actuate the shafts 69 and 72. In case however, there is a continuous flow of cans on the conveyer belt, as indicated in Figure 8, no stoppage of the mechanism will take place but the pilot wheel will continue to revolve, the rollers 105 passing between the cans as they pass and are received one in each space between the carrying lugs 82 of the conveying chain 81. A curved shield 107 is provided around the outer circular path of the lugs 82, to guide the cans around the curve and prevent their displacement. This shield is preferably mounted pivotally (see Figures 7 and 8) on a pin 108 so that it may automatically swing outwards in case accidentally a larger article should pass. The pin 108 is mounted in a yoke 109 that is supported on the channel bar 36 and is provided with a rearwardly projecting arm 109$^a$ having a threaded lug 109$^b$ for the reception of an adjusting screw 110. The shield 107 is fastened to a U bar 111 through which the pin 108 passes and a coil spring 112 is adjustably attached to the arm 109$^a$ and to the U bar 111 and holds the shield in position, adjusted by the screw 110, which forms a stop for the U bar 111. By adjusting the screw 110 the position of the shield 108 may be adjusted to facilitate the passage of the cans and the shield may be momentarily forced outwards against the tension of the springs 112 if ob-

The parking mechanism.

In Figures 1, 2, 13, 14, 17 and 18 I have illustrated the means whereby the cans or other similar articles received by the conveyer belt, as above described, are automatically arranged or parked in rows upon rectangular plates or flat trays which may be of any suitable material such as metal, compo-board or wood, etc. The trays 113 are placed in a hopper or receptacle composed of vertical angle bars or posts 114 supported upon the main frame by brackets 115. Below the hopper is a reciprocating carriage 116 to which is fastened supporting longitudinal shafts 117 slidably mounted in bearings 118 upon the frame 20 and provided with miter gears 119

A cross shaft 120, carrying miter gears 119$^a$ in mesh with the gears 119, is journaled on the carriage 116. Upon the shafts 117 are secured feeding or pushing members, in the present application shown as three in number on each shaft designated in pairs as 121, 122 and 123, each pair being spaced substantially one third the width of the trays apart lengthwise on the shafts 117 as indicated in Figure 2. The rear pair of feeding members are formed in narrow segments or arms 121, the second pair are in the form of a wider segment of substantially 120 degrees and the first pair I have shown in the form of a complete circular disc. The periphery of the segments and discs are concentric to the shafts 117 and suitable collars 124 abutting the carriage frame are provided on the shafts 117 to cause the shafts to reciprocate with the carriage. At predetermined intervals the carriage is caused to make one outward and one backward movement to feed the trays from the supply hopper to the loading device. The primary actuating means for this operation consists of crank arms 125, (see Figures 13 and 14), secured to a short shaft 126 and having crank pins 127 from which connecting rods 128 extend to the carriage 116, the rods being pivotally connected to the carriage. The shaft 126 is mounted in bearings 130 upon frame members 131 and an arm 132, carrying a spring pressed pawl 133, is keyed or otherwise securely fastened to turn with the shaft 126. A sleeve or hub 134, connecting in any suitable manner a gear wheel 135 and a ratchet wheel 136 to turn together therewith, is mounted upon the shaft 126, but rotatively independent thereof. The ratchet wheel 136 and gear 135 are driven continuously in the direction of the arrow in Figure 13 by the gear 32 upon the driving shaft 31. The shaft 126 is normally stationary in the position of the parts shown in Figures 1, 13 and 14 and is kept stationary by the pawl 133 being held out of engagement with the ratchet wheel 136 by a pin 137. When the pin 137 is withdrawn from the pawl 133, the pawl will engage the ratchet wheel 136 and the shaft 126 will be rotated one revolution at the completion of which the pawl will be thrown out of contact with the ratchet by the beveled face 133$^a$ of the pawl again coming in contact with the pin 137. A stop lug 138, against which a shoulder of the pawl strikes, preferably projects from a bracket 139 and prevents overthrow of the shaft 126 when coming to a stop. The bracket 139 forms a guide for the pin 137 and this pin is preferably formed by bending the end of a rod 140 backwards, as shown in Figure 14, the rod 140 also passing through the bracket 139. The pin 137 is tripped to release and returned to again contact the pawl at predetermined intervals by means hereinafter described and as the shaft 126 is rotated the carriage 116 is first moved to the position shown in Figure 2 and then returned to the position shown in Figure 1. A lever 141 is pivoted at 142 to the frame 20 and extends upwards in the path of pins or lugs 143 projecting from a wheel 144 that is fastened to the cross shaft 120. A coil spring 142$^a$ tends to normally hold the lever against the upper cross girder 20$^a$ of the frame. The lugs 143 are three in number and arranged triangularly upon the wheel 144 as shown in Figure 2 and when the carriage is moved from the position shown in Figure 2 to that shown in Figure 1, the right hand lower lug 143 will have struck the upper end of the lever 141 at the last position of the travel and turned the wheel 144 and shaft 120 one-third of a revolution.

Through the miter gears 119 and 119$^a$ the rotation of the shaft 120 will be communicated to the shafts 117 at a like ratio of rotation and therefore the horizontal feed arm 121, as seen in Figure 2, will be raised to a vertical position. The trays are conducted to the filling station upon angle rails 145, arranged below the hopper and supported upon the brackets 115. (Figures 2 and 12.) The vertical hopper posts 114 abut the angle rails 145 and a slot 147 is cut in the flange of the rear posts 114 at their lower ends through which the trays are ejected from the hopper. The slot 147 is of a certain height to permit only one tray to pass at a time and strips 148 attached to the rear hopper posts 114 immediately above the slots 147, guide the trays as they are being pushed against each other to the filling station. As illustrated in Figure 2, the lowest tray in the supply hopper has been pushed two thirds from the hopper in two successive movements, during the first movement of which the tray was pushed one-third from the hopper by the discs 123 and during the second movement the tray was pushed one-third more by the segments 122. During the movement following the position shown in Figure 2, the tray will be pushed the last one-third from the hopper by the arms 121 which will then be in the vertical position. In the position shown the trays in the hopper are supported by the discs 123 at their front or right hand ends. It will be understood that the carriage 116 travels a greater distance in each direction than the trays are moved during the feeding stroke of the carriage, and as therefore, on the inward travel of the carriage when it moves in the direction of the arrow the discs 123 pass out from under the hopper, the trays will be supported upon the segments 122 which do not pass out from under the hopper. The shafts 117 will then be simultaneously turned 120 degrees in the direction of the arrows in Figure 12, in the manner above described, and during the last portion of the inward movement, by which the arm 121 will be raised to the vertical position, and the segments will continue to support the trays in the hopper. On the outward travel of the carriage, the lowest tray will be pushed from the hopper by the arms 121 and the trays in the hopper will be supported upon the segments 122 and discs 123 and partially by the now vertical arms 121 which will preferably not have passed entirely from under the hopper. During the last part of the next inward movement after the discs 123 have passed from under the hopper, the shafts 117 will again be rotated 120 degrees as above described, the arms 121 will be lowered, the low or cut away portion of the segments 122 will be brought to the top and the trays in the hopper will drop to the rails 145. On the next outward travel of the carriage the discs 123 will engage the lowest tray and move the tray one third of its length. During the following inward travel of the carriage segments 122 will again be rotated to assume a vertical position and move the tray another third of its length as indicated in Figure 2. As the trays are pushed from under the hopper in steps of one third their length they push the succeeding trays at equal steps beneath the loading mechanism to the loading point.

The trip pin 137 is removed from the pawl 133 and the forward movement of the carriage is begun when a row of cans has been transferred from a loading shelf 160 to the tray, by mechanism which will now be explained, having reference to Figures 1, 2, 17 and 18. The large sprocket wheel 79 carrying the conveyer chain 81 has, as here shown, a pitch circumference corresponding to the total pitch of eight of the conveyer lugs on the chain 81, or in other words when the sprocket wheel has made one revolution the chain 68 has moved across the machine a distance equal to eight of the spaces between the lugs 62. A crank arm 161 having a crank pin 162 is secured to the under side of the sprocket wheel 79 and a lever 163 is fulcrumed on the frame at 163ª and its curved end 163ᵇ projects in the path of the pin 162. The opposite end of the lever 163 is pivotally connected to the trip rod 140 at 164 and a spring 165 tends to hold the lever against a suitable stop 166 in the full line position shown in Figure 17.

At each revolution of the crank arm 161 at a point co-related in time to the operation of the loading mechanism the curved end 163ᵇ of the lever 163 is contacted by the crank pin 162 and forced from the full line to the dotted line position in Figure 17. By reference to Figures 13 and 14 this operation will be seen to have the effect of moving the trip rod 140 to the dotted line position in Figure 14 and will release the pawl 133 for engagement with the ratchet wheel 136. As the crank pin passes the lever 163 the spring 165 will immediately return the lever to the normal position. The cans C are conducted across the machine in a row between the conveying lugs as heretofore described sliding on the shelf 160. This shelf is a thin plate and extends longitudinally towards the front end of the machine and also laterally to the channel bar 36. The plate 160 is supported upon brackets 167 projecting upwards preferably from the cross girders 37 (Figures 3, 4 and 7) and is arranged just above the path of the trays— which pass closely underneath the plate. A transverse push bar 168 is arranged between the conveyer chain 81 and shelf 160 and is held in parallel relation to the chain by links 169 that are pivoted to the push bar 168 at 170 and to rocker arms 171 and 172 at 171ª and 172ª respectively. The arms 171 and 172 are fulcrumed at 173 on a frame bar 174 fast to the plate 160 and have sliding slot connection at 175.

Figure 15:
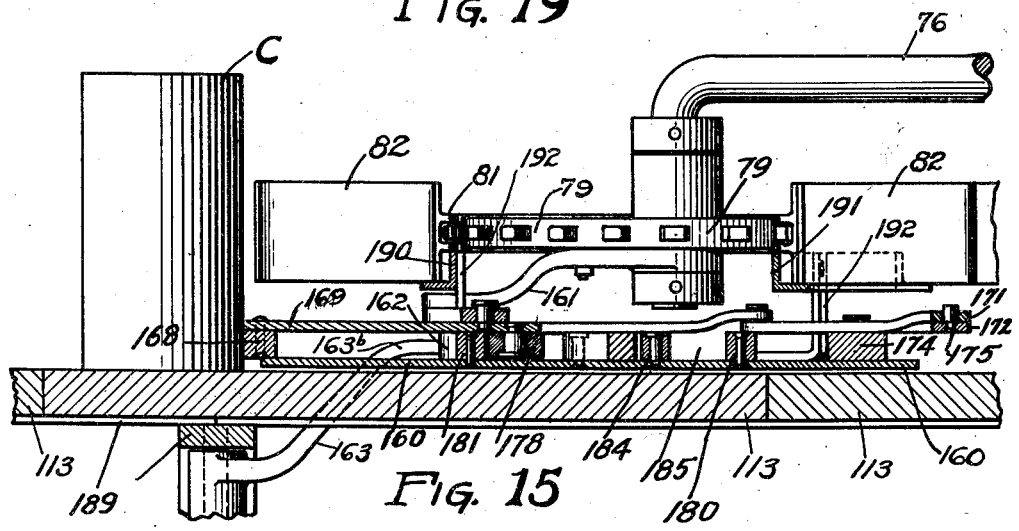
Figure 15 is a cross section on the line 15—15 of Figure 17.
Figure 16:
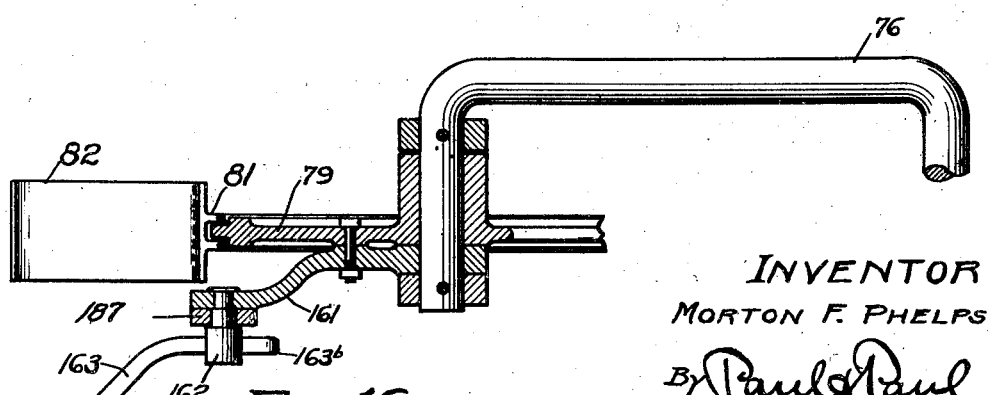
Figure 16 is a detail section on the line 16—16 of Figure 17.

A horizontal driving lug 177 projects from the push bar to near the center of the plate 160 where it is provided with a roller 178 engaged in a controlling cam slot or track 179. This track is constructed preferably of a triangular rail fastened to the plate 160 composed of a section 180 parallel with the push bar 168, an adjoining inclined section 181 turned backwards and outwards at an obtuse angle and an inclined section 182 turned backwards and inwards towards the parallel section 180 at an acute angle thereto and terminating in a short section 183 parallel to the section 180. A latch 184 is arranged normally parallel to the section 180 forming a cam track 185 and a latch 186 parallel to the section 181 forming the track 179. A spring 185ª attached to both latches holds the latch 184 normally resting against the terminal 183 and also the latch 186 against the parallel section 180 as shown by full lines in Figures 17 and 18. A rod or link 187 connects the driving lug 177 for the push bar 168 with the crank pin 162. It will be seen that as the crank arm 161 is rotated starting from the position shown in Figure 1 the roller 178 will travel in the direction of the arrows in Figure 17 first in a straight line in the track 185 during one half of the revolution of the crank shaft and then, passing the latch 186 as indicated by dotted lines in Figure 17 and full lines in Figure 18, will move outwards and backwards in the track 179 and from thence inwards against the acute angled rail 180 to the starting point, passing the latch 184. In the operation of parking the cans on the trays as they arrive one by one at the pilot wheel 99 the cans start the parking mechanism in the manner heretofore described and as the crank arm 161 is thereby caused to rotate while the cans are being carried by the conveyer chain 81 across the shelf 160 as indicated in Figure 18 the crank arm will have made about one half revolution carrying the push bar 168 straight across the machine to the position, relative to the cans, shown in this figure. During the next 90 degrees of travel of the crank arm it will have carried the roller 178 to the terminal of the track 179 and the bar 168 will have pushed the row of cans C off the shelf 160 onto the tray as shown by full lines in Figure 17. The angularity of the crank arm 161 and cam track 179 is so disposed that, during this operation, the push bar is caused to travel transversely of the machine substantially at the same rate of speed as the cans are being moved by the chain lugs. The cans are pushed off the shelf onto the tray in a diagonal direction the last of the cans in the row being aided by the curved end of the shield to come to the proper position on the tray. The backward movement of the push bar is comparatively very rapid caused by the acute angle at the cam section 182 and takes place in a short angle of the crank movement as indicated by dotted lines in Figure 17. This rapid backward movement of the push bar keeps the bar ahead of the oncoming cans until, at the dotted line position, the cans may again pass across the outer edge of the bar. At about this point the lever 163 is tripped by the crank arm 161 thereby starting the mechanism for moving the trays as heretofore described and the tray will then be moved to the position shown in Figure 18, making room for another row of cans on the tray. By this time, if the cans continue to arrive steadily, the crank arm 161 will again have arrived at the point shown in Figure 18 and the operation will be repeated. If for any reason the cans should cease to come to the pilot wheel after the tripping of the lever, the movement of the crank arm would immediately cease until again commenced by the arriving cans operating the pilot wheel but the operation of moving the tray would be completed independent of the movement of the chain conveyer. The trays may slide upon rails 189 away from the machine or suitable conveyers not shown may be arranged to carry the trays to their destination. In order to prevent displacement of the conveyer belt 81 I prefer to provide supporting guide rails 190 and 191 under the belt preferably constructed of angle bars and supported in a raised position above the shelf 160, by brackets 192, as shown particularly in Figures 9 and 15. For convenience in keeping the tray hopper continuously supplied with trays I also prefer to provide shelves 193 upon which a supply of trays may be accumulated ready for introduction into the tray hopper. From the foregoing detailed description of the construction and operation of the machine it will readily be seen that the operation of arranging or parking a predetermined number of containers on trays and arranging said containers in a predetermined order in said trays does not depend on the number or regularity of deliveries of containers to the machine, but is automatically carried out by the machine, independent of the number of receiving stations or containers received by the machine at each station. It will be readily understood that the number of containers placed in a single row upon a tray may be varied by changing the pitch diameter of the sprocket wheel 79, that the number of rows of containers on each tray may be varied by changing the number of pins 143 in the wheel 144 and correspondingly changing the number of feeding members of the trays on the shafts 117 and that the machine may be adjusted or built to operate with trays and containers or other articles of different size and form.

*Modified construction using endless carrier.*

Referring now to Figures 20 and 21, where an endless carrier is substituted in place of the carrying trays for receiving and automatically carrying the containers in parked rows away from the machine to a drying room or other desired destination, it will be noted that the upper half of the endless carrying belt 194 is arranged to pass directly underneath and close to the loading shelf 160. The belt 194 is mounted on a driving pulley 195 and an idler pulley 196. The pulley 196 is shown mounted on the frame 20 of the machine on a shaft 197, and provided with suitable belt tightening means 198. It may, if preferred, be arranged in bearings independent of the machine. The driving pulley 195 is mounted on a shaft 199, having bearings in suitable standards or brackets 200, located in a convenient place, so that the containers may be discharged at the desired point after passing through a drying or other preparation room (not shown). The containers are preferably pushed off the loading shelf 160 and onto the carrier belt 194 in rows containing the predetermined number of containers in the same way that they are pushed onto the trays and by the same mechanism as heretofore described. The speed of the belt is timed relative to the said mechanism, so that suitable uniform spaces will be left between the rows of containers, on the belt, when the machine is running at full capacity. While any preferred means of driving the pulley 195 at the required slow speed may be employed, I have illustrated the pulley shaft 199 carrying a worm wheel 201 in mesh with a worm 202 arranged upon a shaft 203, and a pulley or gear 204 on the shaft 203 to which continuous, motive power is applied from any suitable source at the required speed. While the continuously moving carrier, as illustrated in Figures 20, and 21 is simple in construction, it is apparent from the operation of the machine that if the articles to be parked on the carrier are not supplied to the machine at a uniform rate, the time between the deposits of rows of articles will vary accordingly and as a consequence the spaces between the rows on the carrier will not be the same at all times.

In Figures 22 and 23 the carrier belt 194 is operated intermittently, the operation of moving the belt being controlled by the same mechanism as for moving the trays, and the spacing of the articles on the belt carrier will, therefore, be uniform under all conditions. The belt 194 is here shown as mounted on two concentric pulleys 205, between which, on the pulley shaft 206, is fastened a ratchet wheel 207. Bell crank levers 208 are mounted loosely on the shaft 206, and a spring controlled pawl 209 is arranged on said levers to actuate the ratchet wheel 207 when the levers 208 are rocked in a forward direction. A rod 210 connects the bell crank levers 208 with the crank arms 125 on the shaft 126 and when this shaft is caused to make a half revolution as heretofore described, the belt pulley 205 will be rotated one step. The distance traveled by the belt 194 at each step is made to correspond to the predetermined uniform spacing of the articles on said belt. Supporting strips 211 are preferably provided for the upper half of the belt. The pulley (not shown) at the opposite end of the belt may be provided with tightening devices, or other tightening pulleys may be provided, where the carrier belt is extended to greater lengths. Intermittent gearing may be substituted for the ratchet wheel, or this wheel may be arranged at the end of the pulley shaft and various other modifications may obviously be made of this construction.

In Figure 24 is illustrated means for feeding the empty trays and carrying the loaded trays automatically to their destination by means of the endless carrier. The carrier belt, which preferably here takes the form of one or more chains 212 mounted on sprocket wheels 213, is provided with lugs 214 spaced apart, on the chain a distance equal to substantially the length of the trays, and projecting upwards into the tray receptacle to engage the lowermost tray. The sprocket wheels and chain are actuated in a step by step forward movement corresponding in length to the length of the trays, and the number of rows to be arranged thereon, and are operated and controlled substantially by the same means as the carrier belt shown in Figures 20 and 21. As the chains 212 move forward the empty trays are removed successively step by step from the tray receptacle, passed underneath the parking mechanism and after being loaded with the articles continue to move forward until removed from the carrier.

It is further obvious that various modifications of construction of the detail parts embodied in the machine may be made without departing from the principle or scope of the invention, and I do not, therefore, confine my claims to the details of construction.

I claim as my invention:

1. A device for arranging and parking containers on trays, comprising an endless conveyer having conveying lugs spaced thereon and driven by a sprocket wheel loosely mounted upon a rotating shaft, driving means, between said shaft and sprocket wheel normally inactive, a spider wheel mounted to be actuated by the containers to be parked, tripping mechanism arranged between said wheel and said driving means for making driving connections between said rotating shaft and said sprocket wheel when said spider wheel is actuated by a container, means cooperating with said spider wheel for guiding said container between said conveying lugs, a stationary platform upon which the container is conducted by the conveying lugs, mechanism for automatically stopping the travel of the conveyer chain when the container arrives on to the stationary platform, until another container actuates the spider wheel, and actuating means controlled by the conveyer chain for periodically pushing a predetermined number of said containers off from the stationary platform onto a movable platform.

2. In a machine of the class described, the combination, with conveying mechanism for placing containers in rows upon a receiving tray, of a magazine in which a supply of trays are stacked, a reciprocating carriage underneath said magazine, a series of pushers arranged upon said carriage and spaced apart relative to the direction of the travel of the carriage a distance corresponding to the space between said rows, means for bringing said pushers successively in position to engage the lowermost tray in the magazine during the backward travel of the carriage, actuating means controlled by said conveying mechanism for periodically causing said carriage to make a backward and a forward stroke, and means for thereby causing said lowermost and said receiving tray to move forward a distance corresponding to the predetermined distance between the rows of containers upon the receiving tray.

In witness whereof I have hereunto set my hand this 24 day of October, 1921.

MORTON F. PHELPS.